(12) United States Patent
Olvera

(10) Patent No.: US 12,533,737 B2
(45) Date of Patent: Jan. 27, 2026

(54) METHOD FOR MANUFACTURING A ROTATABLE TOOL BODY TO MINIMIZE CUTTING INSERT RUNOUT, A TOOL BODY PRODUCED THEREFROM, AND A METHOD OF USING SUCH A TOOL BODY

(71) Applicant: Makino Inc., Mason, OH (US)

(72) Inventor: David Olvera, Washington Township, OH (US)

(73) Assignee: Makino Inc., Mason, OH (US)

( * ) Notice: Subject to any disclaimer, the term of this patent is extended or adjusted under 35 U.S.C. 154(b) by 583 days.

(21) Appl. No.: 17/465,891

(22) Filed: Sep. 3, 2021

(65) Prior Publication Data

US 2023/0075742 A1    Mar. 9, 2023

(51) Int. Cl.
  *B23C 5/20*    (2006.01)
  *B23P 15/34*   (2006.01)

(52) U.S. Cl.
  CPC ............... *B23C 5/20* (2013.01); *B23P 15/34* (2013.01)

(58) Field of Classification Search
  CPC ....... B23P 15/34; B23C 5/109; B23C 5/2213; B23C 2210/168; B23C 2200/367
  See application file for complete search history.

(56) References Cited

U.S. PATENT DOCUMENTS

| | | | | |
|---|---|---|---|---|
| 7,836,980 | B2 * | 11/2010 | Stevens | E21B 10/43 175/383 |
| 2003/0150649 | A1 * | 8/2003 | Sved | E21B 7/046 175/398 |
| 2008/0170921 | A1 * | 7/2008 | Sjoo | B23G 5/184 408/232 |
| 2009/0044663 | A1 * | 2/2009 | Stevens | E21B 10/633 175/398 |
| 2010/0089661 | A1 * | 4/2010 | Welch | E21B 10/43 175/428 |
| 2014/0086694 | A1 * | 3/2014 | Fang | B23C 5/205 407/113 |
| 2014/0246249 | A1 * | 9/2014 | Cheng | B23P 15/28 175/426 |
| 2015/0328696 | A1 * | 11/2015 | Wang | B23B 51/06 408/57 |
| 2017/0355031 | A1 * | 12/2017 | Metelsky | B23F 23/12 |
| 2018/0065196 | A1 * | 3/2018 | Kachler | B23C 5/28 |
| 2019/0084058 | A1 * | 3/2019 | Fujiwara | B23C 3/36 |
| 2019/0210124 | A1 * | 7/2019 | Slusarcyk | B23C 5/109 |
| 2020/0198019 | A1 * | 6/2020 | Tanaka | B23C 5/109 |
| 2020/0269325 | A1 * | 8/2020 | Zhao | B23C 5/202 |
| 2021/0283699 | A1 * | 9/2021 | Schmitt | B23C 5/109 |

OTHER PUBLICATIONS

Joshua Jablons, Circular Runout Vs Total Runout, Jul. 8, 2017 (Year: 2017).*
Reginal Dewil, A Critical Review of Multi-hole Drilling Path Optimization. Jan. 20, 2019 (Year: 2019).*

* cited by examiner

*Primary Examiner* — Adam J Eiseman
*Assistant Examiner* — Fernando A Ayala
(74) *Attorney, Agent, or Firm* — The Webb Law Firm

(57) ABSTRACT

A method for manufacturing a rotatable tool body with pockets positioned circumferentially between flutes about a cylindrical body to accept removable cutting inserts and to distribute the circular runout in a fashion among all of the insert pockets to minimize impact on any particular insert and to increase tolerances. A rotatable tool body also includes these features and a method for utilizing such a rotatable tool body is disclosed.

19 Claims, 9 Drawing Sheets

METHOD FOR MANUFACTURING A ROTATABLE TOOL BODY TO MINIMIZE CUTTING INSERT RUNOUT, A TOOL BODY PRODUCED THEREFROM, AND A METHOD OF USING SUCH A TOOL BODY

BACKGROUND OF THE INVENTION

Field of the Invention

The subject application is directed to a method for manufacturing a tool body to minimize circular runout, a tool body manufactured using such a method, and a method utilizing such a tool body.

Description of Related Art

Since the subject invention is directed to a method of machining a tool body, the resulting tool body and a method for using the tool body, then FIGS. 1 and 2, illustrating a typical milling cutter, will be used to describe both the prior art and, as will be discussed, the subject invention.

FIGS. 1 and 2 illustrate a milling cutter 10 which has a tool holder 12 and a tool body 16. The tool body 16 is cylindrical about a longitudinal axis 17 and has a plurality of pockets 20A, 20B, 20C designated herein as a primary pocket 20A, a first secondary pocket 20B, and a second secondary pocket 20C, wherein the first secondary pocket 20B and the second secondary pocket 20C comprise a pair of secondary pockets.

Furthermore, while the tool holder 12 illustrated in FIGS. 1 and 2 is a solid shank integral with the tool body 16, this is for illustrative purposes only and the tool body 16 may be secured to any number of different types of tool holders. In particular, there are multiple variants of tool holders for holding a tool body with a shank. There are also tool bodies that attach to tool holders with fasteners (shell mill), or with a flange that bolts to the tool holder, etc. Furthermore, the tool body may be a shell (single bolt down the center, drive keys on the periphery), body with a shank (shank goes into a holder with a hole), screw-on type connection (body has threads that screw into the holder), flange mount (body has a flange with bolts holding it to the holder), a CAPTO® connection by Sandvik, or an integral tool body with the back end actually being the holder that goes into a spindle. The description herein is intended to apply to at least each of these tool bodies.

The milling cutter 10 in FIG. 1 is made up of four separate rows 22, 23, 24, 25 of pockets, wherein the pockets of adjacent rows generally define a helical line. Flutes 26, 27, 28 exist between each helical line of pockets.

While the milling cutter 10 illustrated in FIGS. 1 and 2 is designed to rotate in a counterclockwise direction 19 and is, therefore, considered to be a right-handed cutter, it should be appreciated that cutters exist where the inserts and pockets are facing in the opposite direction, i.e., flipped 180° about the longitudinal axis 17, such that the cutter would then be designed to rotate in the clockwise direction and considered to be a left-handed cutter. While most of the discussion herein is directed to right-handed cutters, it should be appreciated that the same concepts are equally applicable to left-handed cutters.

Each pocket, for example, primary pocket 20A, has a back wall surface 30A, a radial side wall surface 35A, and may also have an axial side wall surface 40A. FIGS. 1 and 2 show a row 22 of pockets at the distal end 18 of the tool body 16. It should be noted that, as illustrated in FIG. 1, the rows 23, 24, 25 of pockets away from the distal end 18 of the tool body 16 do not have axial side wall surfaces. However, in other designs, all or some of the pockets away from the distal end of the tool body may have axial side wall surfaces.

It should be noted that while the discussion herein, with the exception of FIG. 9, will be directed to pockets for accepting rectangular inserts having perpendicular sides when viewed from the top, the same concepts may be applied to pockets for accepting various other insert shapes including, but not limited to, triangular, pentagonal, hexagonal, octagonal, and circular inserts.

FIG. 3 shows a rectangular cutting insert 90 with angled sides forming a trapezoid that may be secured within the pockets 20A-20C of the tool body 16. By using such a cutting insert, the angled sides provide a clearance angle relative to a workpiece during a machining operation. It should be noted that the insert pocket is designed to conform to the sides of the cutting insert to be placed within the pocket. However, hereinafter, for explaining the invention, rectangular cutting inserts and rectangular pockets with perpendicular sides will be discussed with the understanding that the same concepts apply to inserts and pockets of different shapes.

Circular runout is an inaccuracy of a rotating mechanical system caused because a tool or shaft that does not rotate exactly in line with the main axis of the tool or shaft. Circular runout may also be caused by a rotating tool when cutting inserts mounted upon the tool extend radially by different amounts from the centerline of the tool.

Directing attention to FIG. 4, when indexable cutting inserts, for example, C1, C2, C3 with cutting edges CE1, CE2, CE3 are positioned within the pockets P1, P2, P3, it is desirable that all of the pockets P1, P2, P3 are manufactured, as best possible, with identical dimensions within the tool body 16. Directing attention to the rotating tool body 16 in FIG. 4, cutting insert C1 is engaging the workpiece WP. The radial distance from the longitudinal axis 17 of the tool body 16 to the cutting edge CE1 of the cutting insert C1 is the distance X1. As can been seen from FIG. 4, the radial distance from the longitudinal axis 17 of the tool body 16 to the cutting edge CE3 of cutting insert C3 is X2, which is larger than X1, while the radial distance from the longitudinal axis 17 of the tool body 16 to the cutting edge CE2 of insert C2 is X3, which is larger than both X1 and X2. These deviations are the result of the manufacturing processes associated with the pockets.

In particular, machining processes, such as milling with a ball nose end mill as a cutting tool, generate these pockets and the cutting edges of this tool are worn away and begin to recede. The machine tool creating these pockets is programmed to treat each cutting tool as though the cutting tool maintained the same dimensions throughout the machining process. However, as the machining of pockets proceeds with the same cutting tool, the edge of the cutting tool becomes worn and, therefore, the configuration of the pockets is not uniform. In particular, as illustrated in FIG. 4, pocket P1 was machined first such that the distance from the longitudinal axis 17 of the tool body 16 to the edge of the cutting insert C1 is X1. Next, using the same cutting tool, pocket P3 is machined. However, now that the tool has worn down, less material is removed from the pocket P3 than P1 such that the distance between the longitudinal axis 17 of the tool body 16 and the edge of the cutting tool C3 is X2. Finally, using the same cutting tool, pocket P2 is machined with even more of the cutting tool being worn down such that the distance from the longitudinal axis 17 of the tool body 16 to the edge of the cutting insert C2 is X3. The deviation from X may generally be described as circular runout.

The final product of FIG. 4 may be a milling cutter body. Ideally, in a machining application, each cutting edge of a cutting insert in the milling cutter removes the same chip thickness as the previous cutting insert, thereby providing a relatively smooth cutting operation with approximately equal loads placed upon each cutting edge. However, directing attention to FIG. 4 where the insert pockets are all cut differently, the circular runout varies from one pocket to another. Furthermore, for the cutting inserts C1, C2, C3 in pockets P1, P2, P3, when the final manufactured tool body 16, such as a milling cutter, is used for a metalworking operation on a workpiece WP, the load on each of the cutting inserts C1, C2, C3 may vary.

In particular, the cutting edge of a cutting insert of one pocket may have a significant cutting load while the cutting edge of a cutting insert of the adjacent pocket may have little or no cutting load.

As shown in FIG. 4, with the tool body 16 rotating in the counterclockwise direction shown by arrow 19, cutting insert C1 removes a portion, identified as chip thickness, of the workpiece WP while cutting insert C2, since it extends in the radial direction a further amount than cutting insert C1, has a greater chip thickness within the workpiece WP and, as a result, imparts a larger loading on the cutting edge of insert C2 than insert C1. Thereafter, cutting insert C3, which has a radial distance less than C2, may encounter very little or none of the workpiece WP such that the cutting load on the cutting edge of cutting insert C3 is significantly less than that for the cutting edge of the cutting insert C2.

While such an arrangement may be tolerable for cutting inserts with cutting edges made of tough material, such as cemented carbide, there is now a move to more frequently use cutting inserts of materials that are hard and brittle, such as polycrystalline diamond (PCD), ceramic, or cubic boron nitride (CBN) for use in machining super alloys. Under these circumstances, while the cutting insert edge is extremely hard and can operate under a demanding environment, the cutting insert is also brittle and the impact load imparted on, for example, insert C2 in the example illustrated in FIG. 4, may damage or prematurely deteriorate the insert.

Furthermore, it is oftentimes desirable to require much higher tolerances when machining with such hard and brittle inserts and, therefore, is beneficial for the insert pockets to be machined with tolerances as close to one another as possible to minimize circular runout. A method is needed to minimize such circular runout or to distribute such runout about the circumference of a tool body to minimize the variation of chip thicknesses from insert to insert removed from uncut material.

SUMMARY OF THE INVENTION

One embodiment of the invention is directed to a method for manufacturing a rotatable tool body with pockets positioned circumferentially between flutes about a cylindrical body to accept removable cutting inserts. The method is comprised of the steps of beginning with a cylindrical blank having a longitudinal axis, identifying a plurality of concentric circles along the cylindrical blank, wherein the concentric circles are spaced along the longitudinal axis and define rows and wherein a plurality of insert pocket locations are spaced circumferentially about the cylindrical blank in each row, and each pocket location is defined by a radial line perpendicular to the longitudinal axis. Thereafter, the method involves machining a plurality of pockets at the pocket locations of each row, wherein all of the pockets associated with one row are machined before proceeding to machine all of the pockets associated with another row and wherein machining a pocket comprises the steps of machining a radial side wall surface and a back wall surface upon which a cutting insert contacts when secured within the pocket.

Another embodiment of the invention is directed to a rotatable tool body. The tool body has a cylindrical body with a longitudinal axis extending therethrough. Pockets are arranged between flutes in rows along concentric circles spaced apart along the longitudinal axis of the cylindrical body. Each pocket has a radial side wall surface and a back wall surface upon which a cutting insert contacts when secured within the pocket. The pockets are spaced circumferentially in rows defined by each concentric circle. The radial side wall of a primary pocket has a value X for circular runout. The radial side wall circular runout for each pocket is progressively greater than the value of X as pockets extend circumferentially away from the primary pocket.

Yet another embodiment of the invention is directed to a method of machining a workpiece with a tool body with inserts. The tool body has a cylindrical body with a longitudinal axis extending therethrough. The tool body also has pockets arranged between flutes in rows along concentric circles spaced apart along the longitudinal axis of the cylindrical body. Each pocket has a radial side wall surface and a back wall surface upon which a cutting insert contacts when secured within the pocket. The pockets are spaced circumferentially in rows defined by each concentric circle. The radial side wall of a primary pocket has a value X for circular runout. The radial side wall circular runout for each pocket is progressively greater than the value of X as pockets extend circumferentially away from the primary pocket. The method of machining is comprised of the step of rotating the tool body in a direction from the primary pocket, where the runout is the least, to the adjacent second pocket where the runout is greater than, but not as great as, the runout of the third pocket.

DETAILED DESCRIPTION OF THE PRESENT INVENTION

Figure 1:
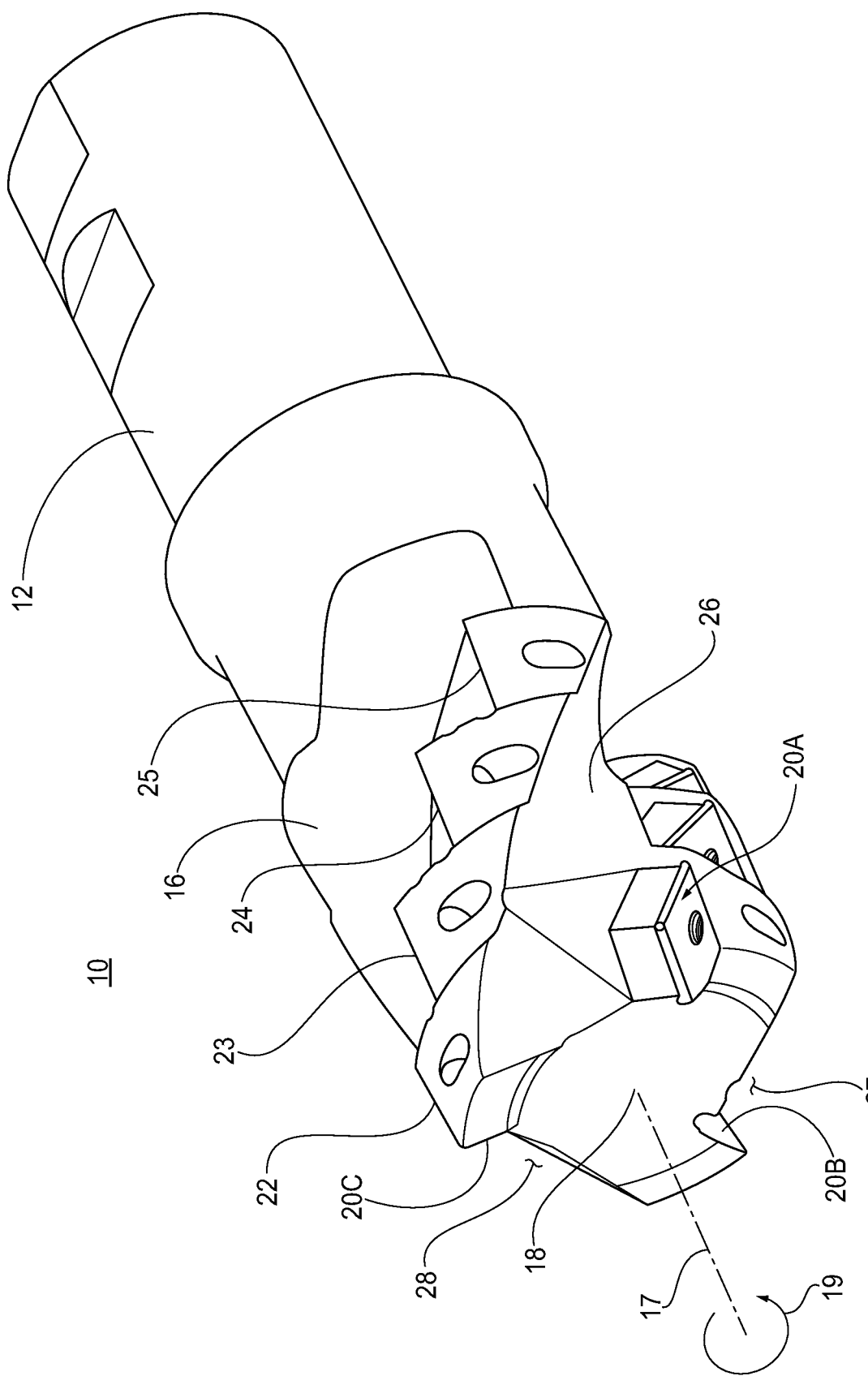
FIG. 1 is a perspective view of a tool body having insert pockets in accordance with one embodiment of the subject invention.

For purposes of the description hereinafter, the terms "upper", "lower", "left", "right", "vertical", "horizontal", "top", "bottom", "lateral", "longitudinal", and derivatives thereof, shall relate to the invention as is oriented in the drawing figures. However, it is to be understood that the invention may assume various alternative variations, except where expressly specified to the contrary. It is also to be understood that the specific devices illustrated in the attached drawings and described in the following specification are simply exemplary embodiments of the invention. Hence, specific dimensions and other physical characteristics related to the embodiments disclosed herein are not to be considered as limiting.

As a general overview, the process described herein is intended to make a better pocketed tool body, to minimize the step change from insert edge to edge (in the same row) to avoid large thickness variations of cut stock that then result in large variations of concentrated cutting force on the PCD cutting edge. With carbide inserts, tool manufacturers have not had to worry about this situation because of the toughness of a carbide edge and its ability to better absorb those cutting forces in the form of impacts and survive them. In light of the toughness of carbide inserts, there is less focus on the consequences of impact, which has a more significant effect on PCD inserts. As a result, the traditional use of carbide inserts does not focus on the different operational needs of PCD insert. The method of spreading out the pocket manufacturing tool's wear over pockets in the same row as opposed to each flute and all rows as described herein achieves better in-row runout control. Current machining methods involve first machining of the rows of one flute along the length of the tool, then machining the rows of the next flute.

Figure 5:
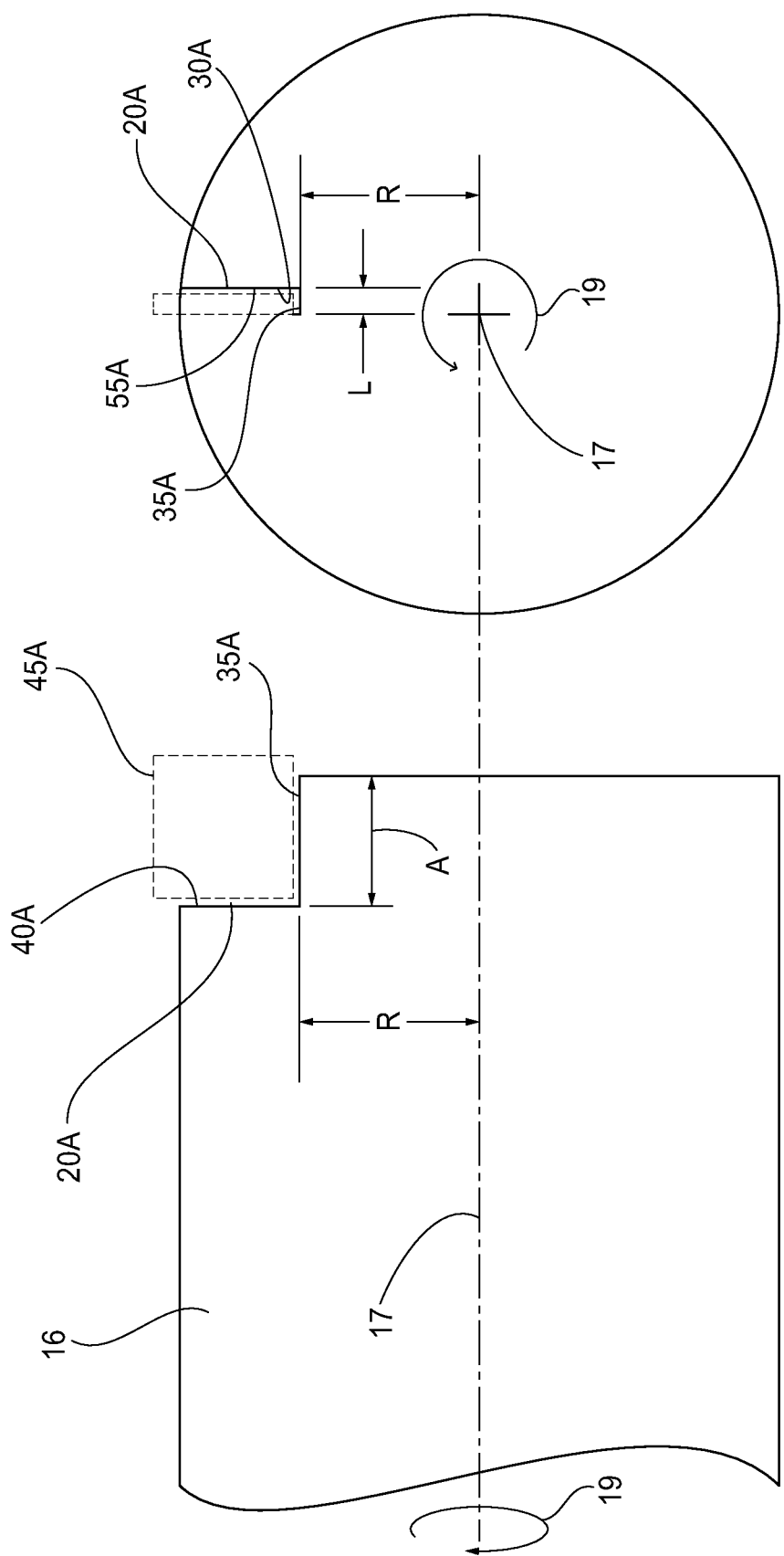
FIG. 5A is a side view of a tool body with a cutting insert in a pocket of a tool body used to illustrate the subject invention.
FIG. 5B is an end view of the side view of FIG. 5A.

Directing attention to FIGS. 5A and 5B, a typical primary pocket 20A is illustrated in a tool body 16 with a cutting insert 45A illustrated in phantom and mounted within the primary pocket 20A. It should be noted that while a single pocket is discussed, such a discussion may be applied to other pockets in the tool body 16. The primary pocket 20A is comprised of a back wall surface 30A and a radial side wall surface 35A. The primary pocket 20A may also include an axial side wall surface 40A. The back wall surface 30A is measured from the longitudinal axis 17 of the tool body 16 and this measurement is shown by the dimension L. The radial side wall surface 35A is also measured from the longitudinal axis 17 of the tool body 16 and this measurement is shown by the dimension R. Finally, the axial side wall surface 40A is measured from the distal end of the tool body 16 and this measurement is shown by the dimension A. The locations of the back wall surface 30A and the radial side wall surface 35A are critical to the determination of the circular runout, while the dimension of the axial side wall surface 40A is important for axial runout.

Figure 6:
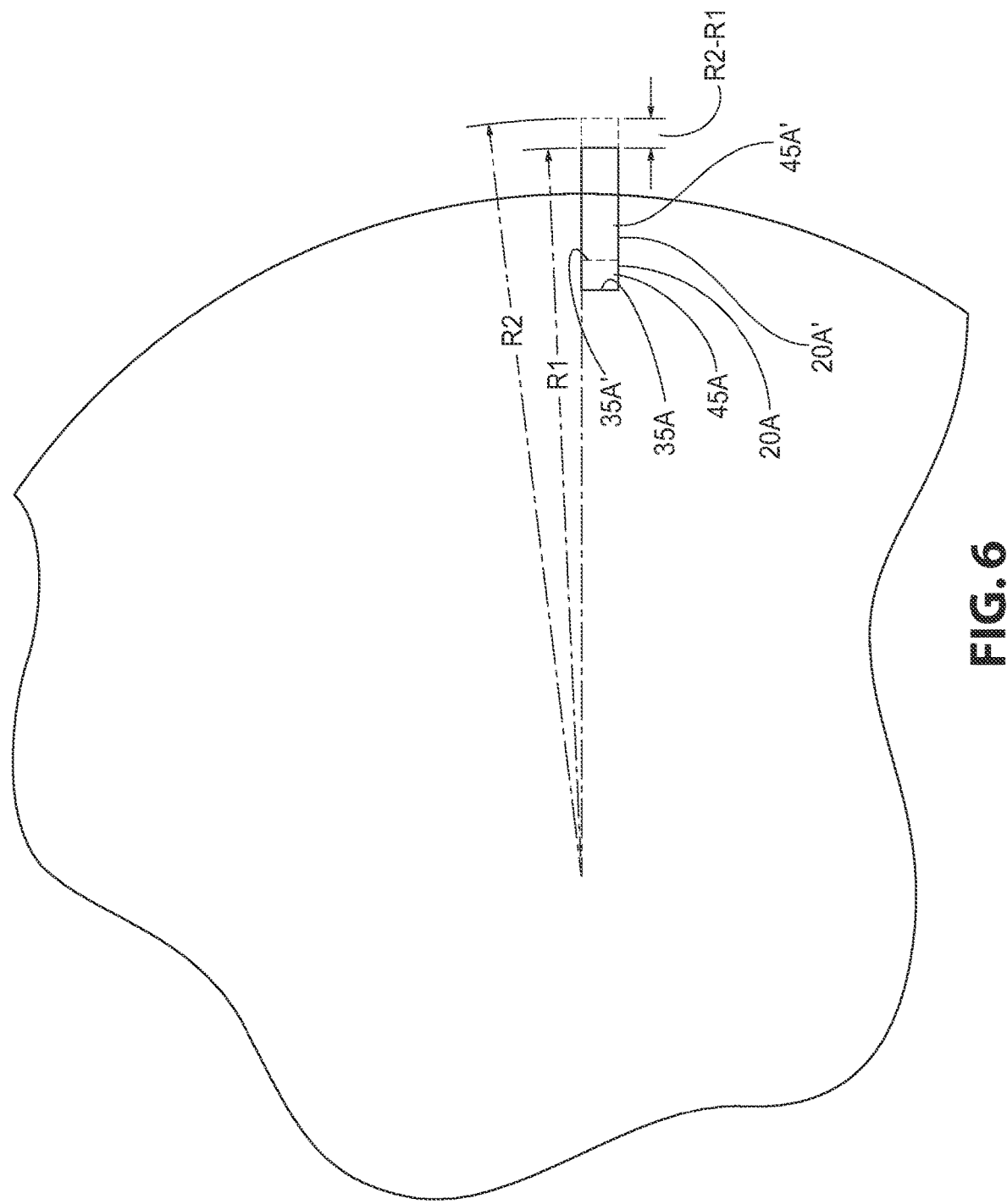
FIG. 6 is an enlargement of a portion of FIG. 5B illustrating the influence of the radial side wall surface of the pocket on the circular runout.

FIG. 6 illustrates the influence the radial side wall surface 35A of a pocket primary 20A has on the circular runout. In particular, using a cutting tool on a machine with preprogrammed dimensions for pocketing, the radial side wall surface 35A is machined. However, for machining a next pocket 20A' with the same cutting tool, the cutting tool experiences wear such that when applied to the tool body 16, the same programmed dimensions for machining will produce a radial side wall surface 35A' that is slightly shifted from the original radial side wall surface 35A. It should be appreciated that for illustrative purposes, two separate pockets 20A and 20A' have been superimposed to highlight the difference in circular runout. As a result, a cutting insert 45A, when placed in the first primary pocket 20A, will extend the radial length R1 to the end of the cutting insert 45A, while for the next pocket 20A', the cutting end of an identical cutting insert 45A' will extend a distance R2 from the longitudinal axis 17 of the tool body 16 such that the circular runout created by the radial side wall surface 35A of these two pockets 20A and 20A' is the difference between R2 and R1.

Figure 7:
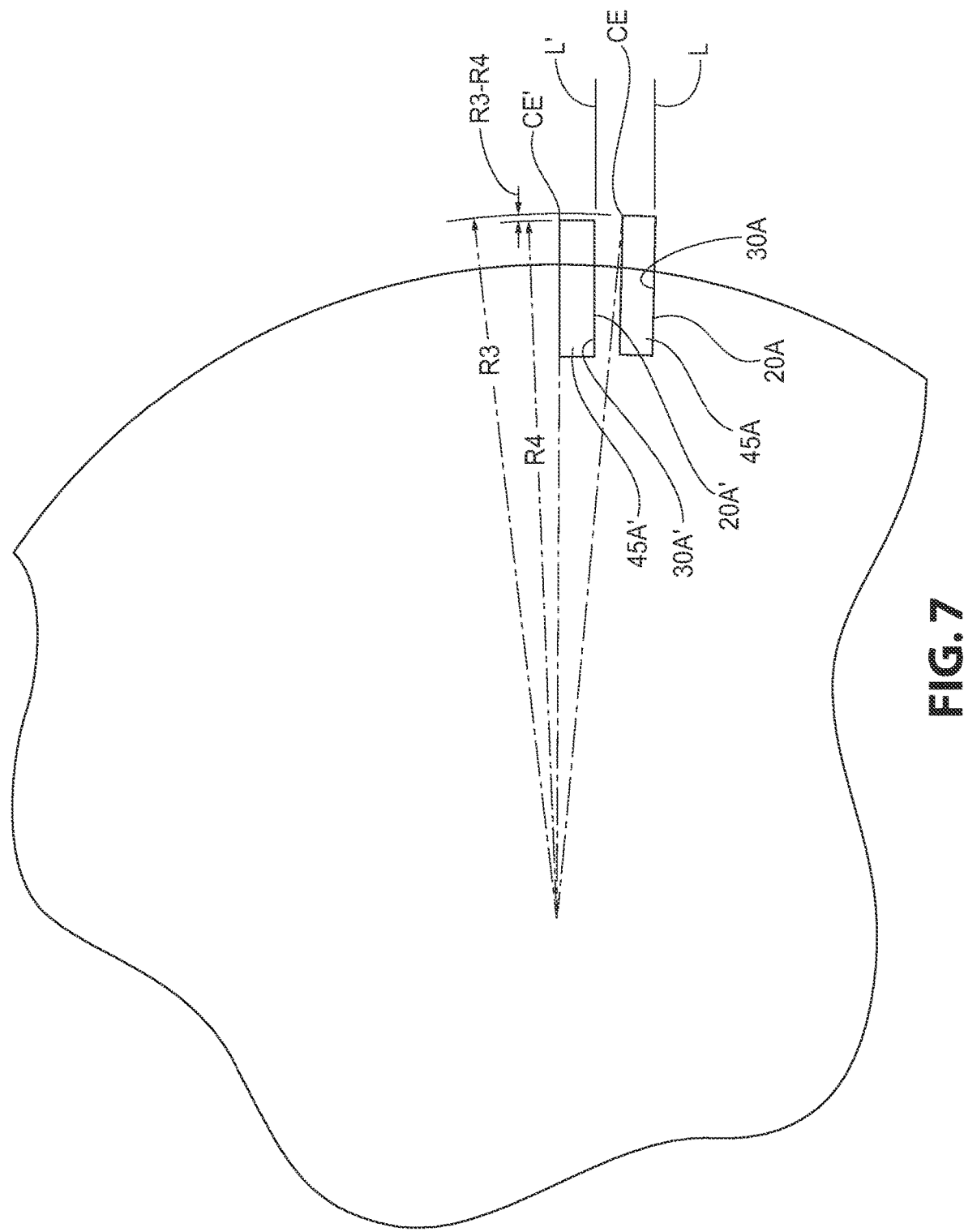
FIG. 7 is an enlargement of FIG. 5B illustrating the influence the back wall surface of the pocket has on circular runout.

Directing attention to FIG. 7, the location of the back wall surface 30A also influences the circular runout. In particular, a machining operation may be used to form the back wall surface 30A in primary pocket 20A using a particular cutting tool. The level of the back wall surface 30A is indicated by L and the cutting edge of cutting insert 45A within such a primary pocket 20A is indicated by CE. However, that same cutting tool, if used to machine a next pocket 20A', for example, would be worn and would not remove the same amount of material. As a result, the position of the back wall surface 30A' of next pocket 20A' is shifted from the position of the back wall surface 30A of primary pocket 20A. The level of the back wall surface 30A' is indicated by L' and the cutting edge of a cutting insert 45A' within such a next pocket 20A' is indicated by CE'. It should be appreciated that for illustrative purposes, two separate pockets 20A and 20A' have been superimposed to highlight the difference in circular runout. As a result, the radial distance to the cutting edge CE of the insert 45A within the primary pocket 20A extends a radial distance R3, while the cutting edge CE' of an identical cutting insert 45A' placed within the next pocket 20A' against the back wall surface 30A' extends a radial distance R4 to the cutting edge CE' of the cutting insert 45A' such that the circular runout is the difference between R4 and R3. As previously mentioned, both the location of the radial side wall surface 35A and the location of the back wall surface 30A contribute to the walls of the pocket that determine the circular runout of a cutting insert placed within the pocket.

Figure 8:
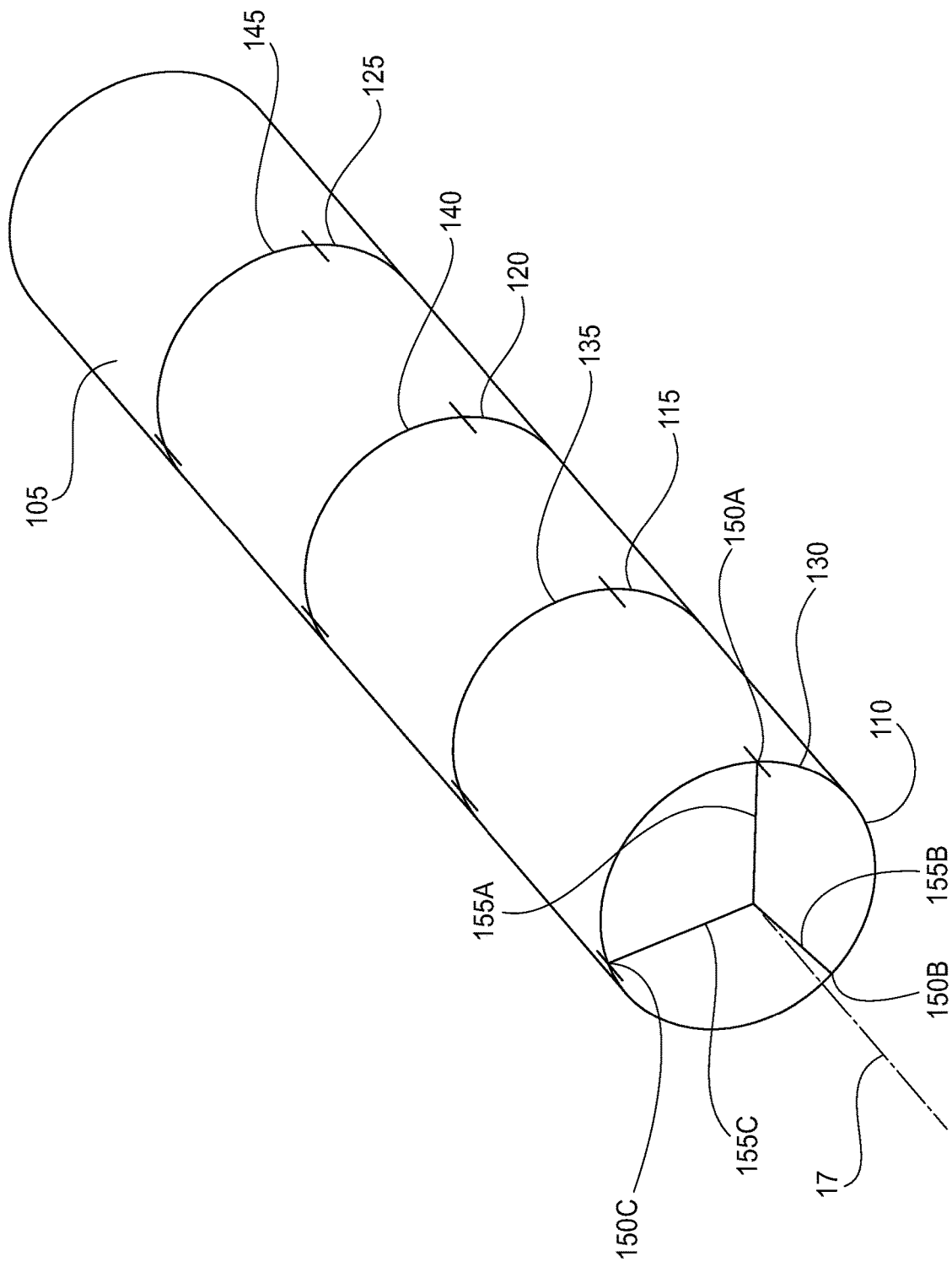
FIG. 8 is a cylindrical blank showing concentric circles defining rows upon which pockets are machined.

FIG. 8 illustrates a cylindrical blank 105 that may be machined to produce a tool body 16. The cylindrical blank 105 has a longitudinal axis 17 and a plurality of concentric circles 110, 115, 120, 125 spaced along the longitudinal axis 17 and define rows 130, 135, 140, 145, similar to rows 22, 23, 24, and 25 of FIG. 1.

At this point, a single row 130 will be discussed with the understanding that the same discussion applies to the remaining rows 135, 140, and 145.

Directing attention to row 130, a plurality of insert pocket locations 150A-150C are spaced circumferentially about the cylindrical blank 105 in each row. For example, in row 130, each pocket location 150A-150C is defined by a radial line 155A-155C along a plane perpendicular to the longitudinal axis 17.

FIG. 8 shows three radial lines representing three inserts. Other designs may include more pockets/inserts and, under the circumstances, each pocket/insert will have a radial line spaced about the centerline of a cylindrical blank.

In a method according to the subject invention, a plurality of pockets, such as pockets 20A, 20B, 20C illustrated in FIG. 1, are machined at the insert pocket locations 150A-150C associated with one row 130 before proceeding to machining any of the pockets associated with the remaining rows 135, 140, and 145. As previously mentioned, machining a pocket comprises at least the steps of machining a radial side wall surface 35A and a back wall surface 30A (FIGS. 1 and 2) upon which a cutting insert contacts once secured within the pocket. As previously discussed, it is also possible to machine an axial side wall surface 40A. The sequence of machining the pockets about each row along the cylindrical blank is important.

Figure 9:
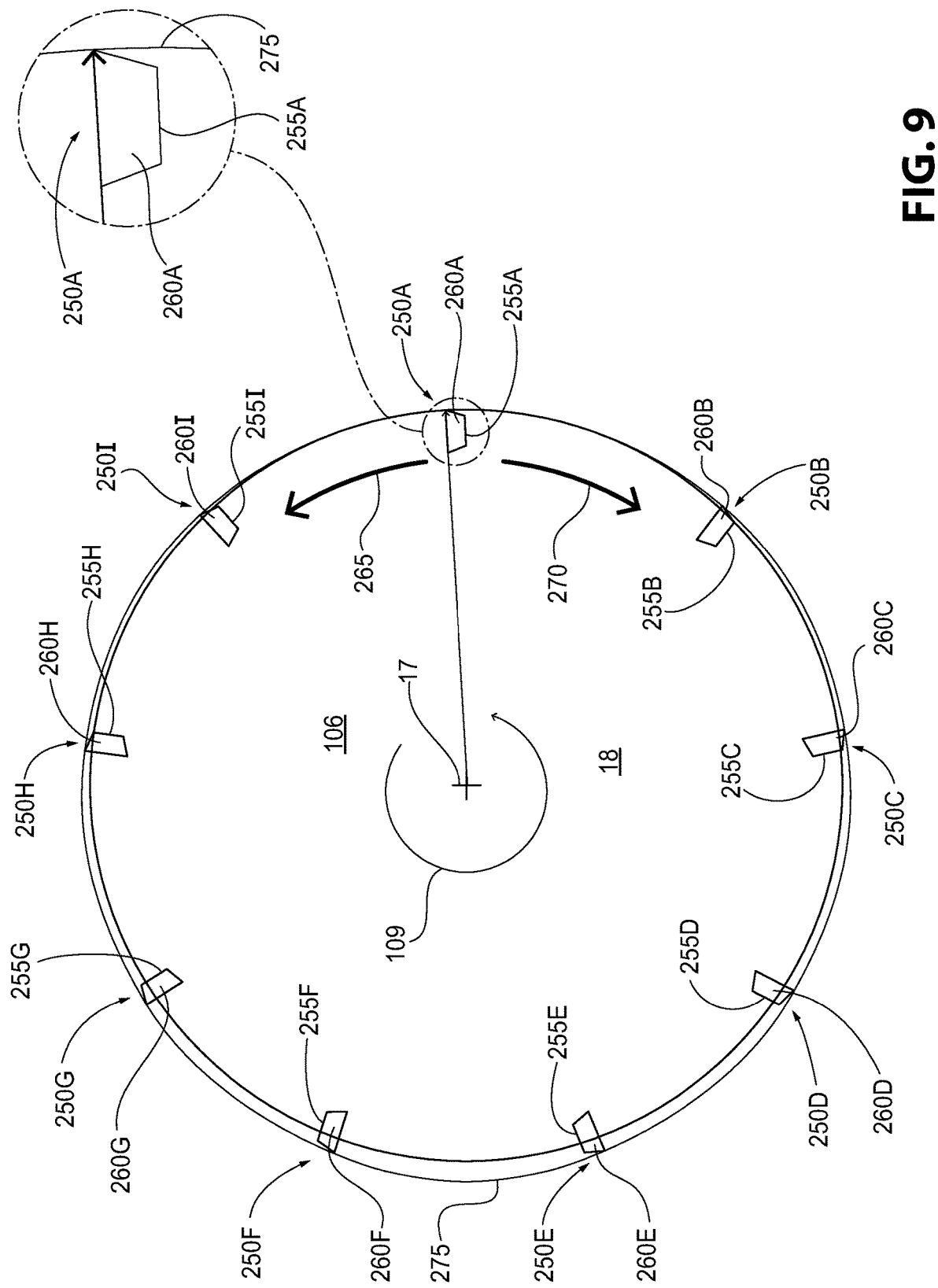
FIG. 9 is an end view of a tool body illustrating an ideal cylindrical envelope of the cutting path of the cutting inserts superimposed over an actual envelope of the cutting path of the cutting inserts that may be achieved using the method of the subject invention.

FIG. 9 illustrates an end view of a cylindrical tool body 106 machined from a cylindrical blank 105 (FIG. 8) for a milling cutter with nine insert pocket locations, 250A-250I, at which locations insert pockets 255A-255I may be machined. For illustrative purposes, cutting inserts 260A-260I are shown because it is from the edge of these cutting inserts 260A-260I that circular runout is measured.

In one embodiment, machining in accordance with the subject invention involves the following steps:
a) first machining the cylindrical blank 105 at a primary insert pocket location 250A to form a primary insert pocket 255A;
b) then machining the cylindrical blank 105 at a pair of secondary insert pocket locations 250B, 250I adjacent to the primary insert pocket location 250A and away from the primary insert pocket location 250A to form a pair of secondary insert pockets 255B, 255I;
c) then machining the cylindrical blank 105 at a pair of tertiary insert pocket locations 250C, 250H, wherein each tertiary insert pocket location 250C, 250H is adjacent to one of the secondary insert pocket locations 250B, 250I and away from the primary insert pocket location 250A to form a pair of tertiary insert pockets 255C, 255H; and
d) then, to the extent they exist, continuing to machine the cylindrical blank 105 at a pair of next insert pocket locations 250D, 250G wherein each next insert pocket location 250D, 250G is adjacent to one of the tertiary insert pocket locations 250C, 250H and away from the primary insert pocket location 250A to form another pair of insert pockets 255D, 255G.

To the extent that they exist, this progression is continued on the remaining pairs of pocket locations. As an example, in FIG. 9, there is a single remaining pair of insert pocket locations 250E, 250F. It should be appreciated that in FIG. 9, there is an odd number of pockets and, as a result, machining pairs of pockets relative to the primary insert pocket 250A will address all of the pocket locations. However, although not illustrated, when there are an even number of pockets, then machining the remaining single pocket location after all of the pairs of pocket locations have been machined is appropriate.

While FIG. 1 illustrates a milling cutter with rows of three pockets and FIG. 9 illustrates a row of nine pockets, it should be understood that the invention should not be limited by these embodiments. It is possible for cutters to have any combination of rows and pockets including one row of three inserts up to, but not limited to, 32 rows of 5 pockets. As more pockets are machined with the same tool, the benefits of the subject invention become more prominent.

As previously mentioned, each pocket may further include an axial side wall surface and when that is the case, the step of machining the pocket locations may also include machining the axial side wall surface.

As can be appreciated, by machining the cylindrical blank 105 in such a fashion, there will be varying amounts of runout in each of the insert pockets. However, by sequentially machining pockets as described herein, the circular runout is distributed about the circumference of the cylindrical blank 105 such that there is a relatively smooth progression of increasing runout to a point furthest away from the primary pocket location 250A. This not only allows the end product, which may be a milling cutter, to maintain closer tolerances, but, furthermore, distributes the cutting load more evenly among cutting inserts within the pockets and minimizes impact upon the cutting edges that may be produced by a cutting insert with a maximum cylindrical runout.

FIG. 9 further illustrates, by arrow 109, a preferred direction of rotation intended for a milling cutter produced from the cylindrical blank 105 (FIG. 8). This is significant because even though what has been discussed so far is machining pairs of insert pockets, further refinement of the invention may be achieved by selecting one of those insert pocket locations of a pair to be machined before the other of those insert pockets locations.

In particular, there is a sequence for machining pairs of adjacent pocket locations along a row comprising the steps of:
a) machining a first insert pocket 255A at a primary insert pocket location 250A;
b) then machining a secondary insert pocket 255I at a secondary insert pocket location 250I immediately adjacent to the primary insert pocket location 250A in an intended first angular direction of rotation 265 of the tool body away from the primary insert pocket location 250A;
c) then machining another secondary insert pocket 255B at a secondary insert pocket location 250B immediately adjacent to the primary insert pocket location 250A in an opposite second angular direction 270 from the primary insert pocket 250A; and
d) continuing to machine adjacent pairs of pockets in an alternating fashion at pocket locations at an angular direction away from the most recently-machined pocket.

In particular, for the arrangement illustrated in FIG. 9, the following sequence of pocket locations would be machined—250H, 250C, 250G, 250D, 250F, and 250E.

Once again, if there is an even number of pockets, then it will be necessary to machine the remaining single pocket location after all of the pairs of pocket locations have been machined.

As illustrated in the row of insert pockets in FIG. 9, each pocket location is arranged at an equal angle about the longitudinal axis 17. This is an optional feature and may hold true for the remaining rows along the cylindrical blank 105 of FIG. 8.

It should be noted that the methods and techniques for machining cylindrical blanks to produce inset pockets is well known and the important feature of the subject invention is the sequence for machining multiple pockets within a row.

In one preferred embodiment, the machining of pockets in accordance with the subject invention is performed using a ball nose end mill. However, it should be appreciated that any number of different metalworking tools or machining processes, including grinding and electro-discharge machining (EDM), may also be used. The same wear phenomena discussed herein with respect to cutting tools will also apply to other metalworking tools, including grinding tools or electrodes used in an EDM process.

Briefly, returning to the embodiment illustrated in FIG. 1, there are flutes extending in a helical direction along the longitudinal axis. It should be noted that the flutes may also be parallel to the longitudinal axis.

What has been described so far is a method for manufacturing a rotatable tool body with pockets positioned circumferentially between flutes about a cylindrical body wherein the pockets accept removable cutting inserts. It should be appreciated that this method may also be applied to the milling cutter illustrated in FIGS. 1 and 2. The subject invention may also be directed to the rotatable tool body itself.

In particular, again directing attention to FIG. 9, with occasional reference to FIG. 1, a rotatable tool body 16 may comprise a cylindrical tool body 106 made from a cylindrical blank 105 with a longitudinal axis 17 extending therethrough. Pockets 255A-255I are arranged between flutes and extend along concentric circles (FIG. 8) spaced apart along the longitudinal axis 17 of the cylindrical tool body 106. Each pocket, for example, insert pocket 255A, has a radial side wall surface 35A (FIG. 2) and a back wall surface 30A upon which a cutting insert contacts when secured within the pocket. Pockets are spaced circumferentially in rows defined by each concentric circle as illustrated in FIG. 8.

Directing attention to FIG. 9, the radial side wall of the primary insert pocket 255A has a value of X for circular runout. Thereafter, the radial side wall circular runout for each pocket is progressively greater than the value of X as pockets extend circumferentially away from the primary insert pocket 255A. As previously discussed, in an alternating pattern extending circumferentially away from the primary insert pocket 255A, the circular runout increases from a value of, for example, X at the primary insert pocket 255A. The applicant has further realized that with a known direction of rotation 109 of the milling cutter, the sequence of machining pockets within a pair may provide yet another benefit.

Therefore, with respect to the rotatable cylindrical tool body 106, when viewed toward a distal end 18 of the cylindrical tool body 106, the pocket 255I closest to the primary pocket 255A in the counterclockwise direction 265 has a circular runout Y greater than X but with the smallest deviation from the circular runout value of X of the primary pocket 255A relative to the remaining pockets. Furthermore, when viewed toward a distal end 18 of the cylindrical tool body 106, the pocket 255B closest to the primary pocket 255A in the clockwise direction 270 has a circular runout Z greater than Y but with the next smallest deviation from the circular runout value of X of the primary pocket 255A.

As further illustrated in FIG. 9, the circular runout of the radial side walls is measured from the tool body longitudinal axis 17 and envelope 275 defined by the circular runout values generally defined as a lobe shape about the longitudinal axis 17 with the smallest circular runout at the primary pocket 255A. The lobe shape may be a concentric circle about the longitudinal axis 17.

While the cylindrical tool body 106 illustrated in FIG. 9 is designed to rotate in a counterclockwise direction 109 and is used for a right-handed cutter, it should be appreciated that cutters exist where the inserts and pockets are facing in the opposite direction, i.e., flipped 180° about the longitudinal axis 17, such that the cutter would then be designed to rotate in the clockwise direction and is used for a left-handed cutter. The features discussed herein with respect to cylindrical tool body 106 for a right-handed cutter also apply to such a tool body for a left-handed cutter.

In particular, if the pockets/inserts are facing in the opposite direction, i.e. flipped 180° about the longitudinal axis 17 to that of the tool body 106 of the milling cutter 100 illustrated in FIG. 9, then the milling cutter will be intended to rotate in the clockwise direction (opposite to counterclockwise direction 109) and the pocket 255B closest to the primary pocket 255A in the clockwise direction 270 will have a circular runout Y greater than X but with the smallest deviation for the circular runout X of the primary pocket 255A relative to the remaining pockets. Furthermore, when viewed toward a distal end 18 of the cylindrical tool body 106 of the pocket 255I closest to the primary pocket 255A in the clockwise direction will have a circular runout Z greater than Y but the next smallest deviation from the circular runout value of X of the primary pocket 255A relative to the remaining pockets.

Figure 2:
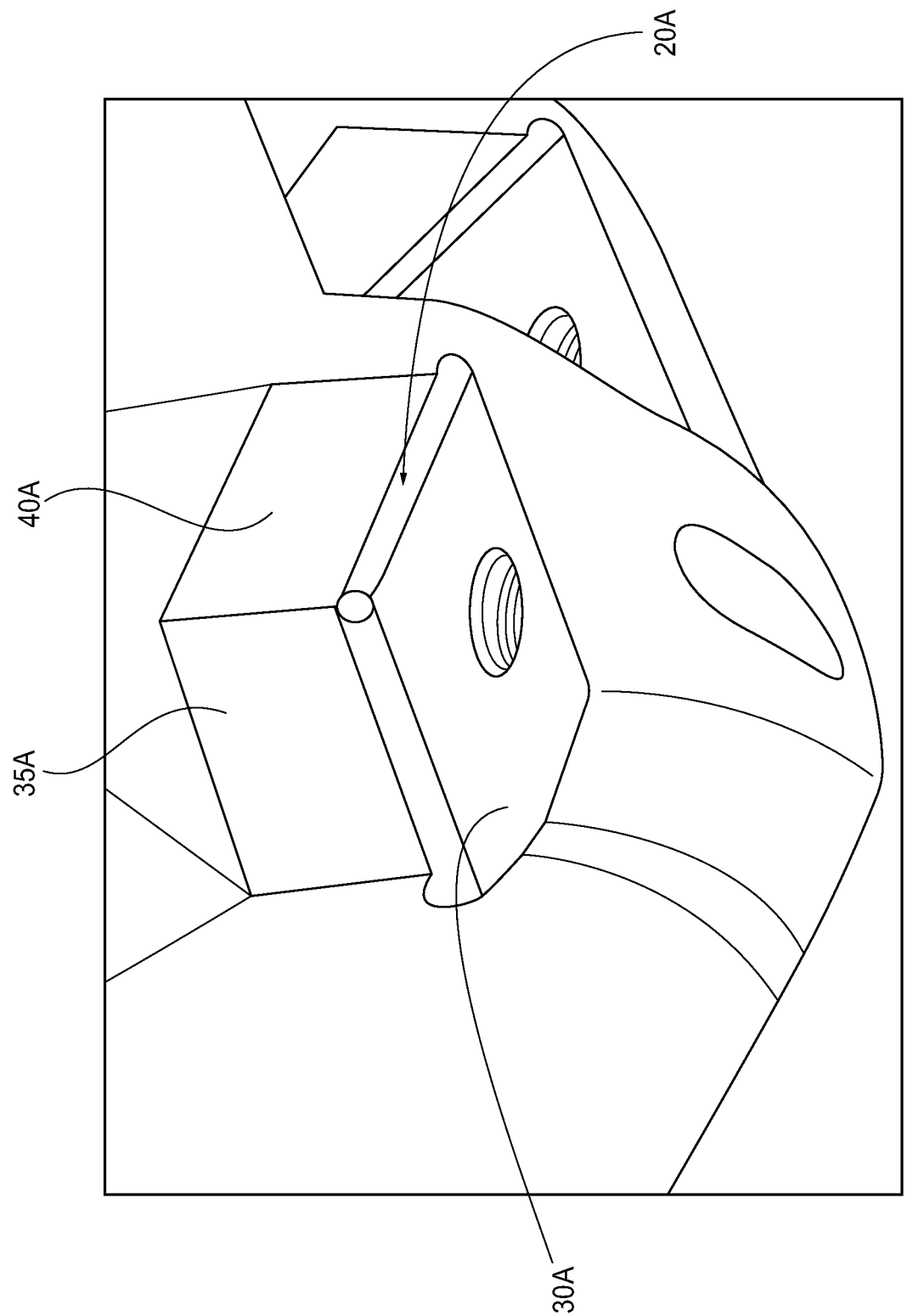
FIG. 2 is an enlargement of a portion of FIG. 1.
Figure 3:
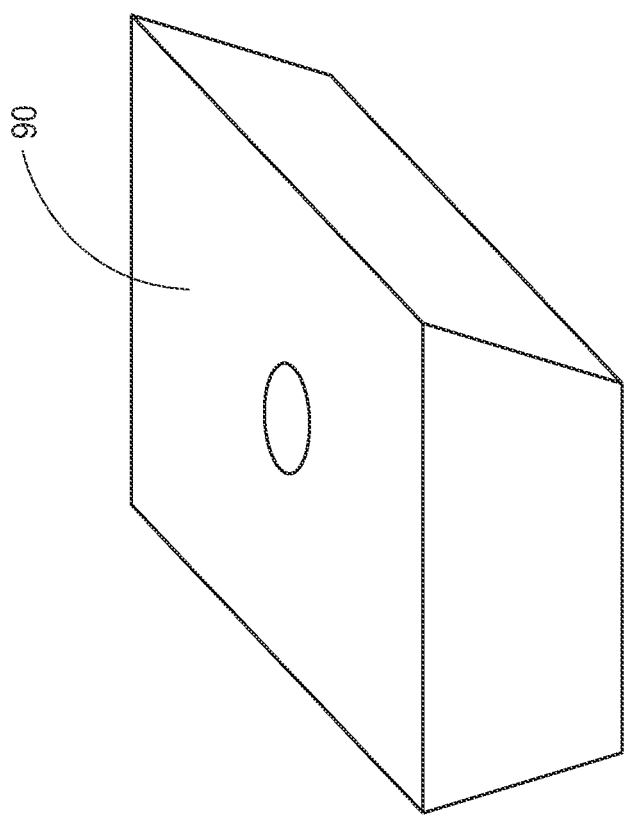
FIG. 3 is a perspective view of a rectangular insert with sides defining a trapezoid that may be suitable for mounting within pockets of a tool body assembled in accordance with the subject invention.
Figure 4:
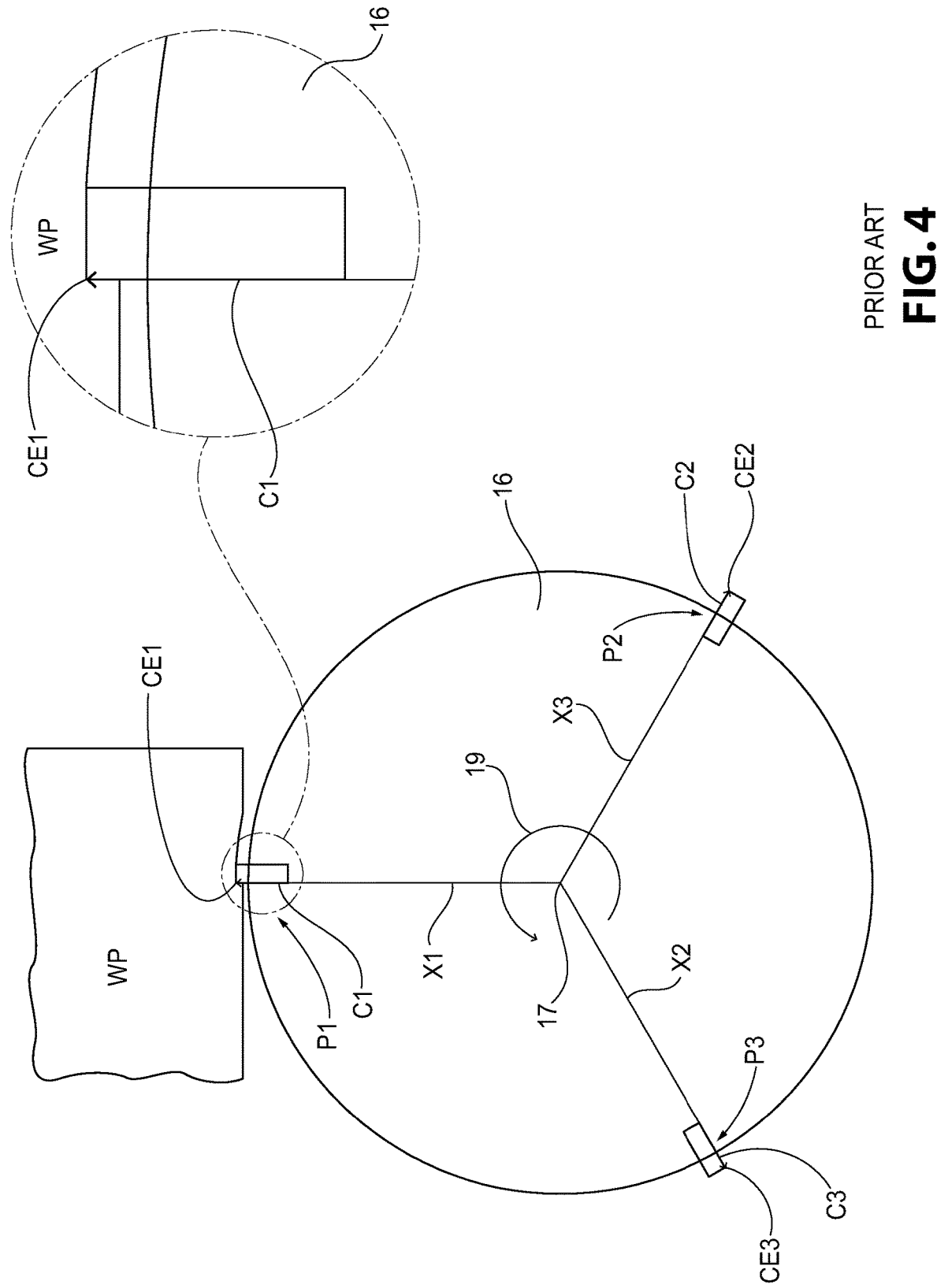
FIG. 4 is a schematic illustrating a machining operation in accordance with a prior art arrangement.

It should be appreciated that the features of this rotatable tool body may also be applied to the milling cutter in FIGS. 1 and 2.

The subject invention is further directed to a method of machining a workpiece with a tool body having inserts using a tool body 16 as described herein and wherein the method of machining is comprised of the step of rotating the tool body 16 in a direction from the primary pocket 255A where the runout is the least to an adjacent second pocket 255I where the runout is greater, but not as great as the runout of a third pocket 255B. With this arrangement, the tool body 16 is rotated in a counterclockwise direction 109 to maximize performance.

It should be appreciated that this method may also be applied to the milling cuter in FIGS. 1 and 2.

An additional benefit to the tool body in accordance with the subject invention is that when PCD cutting inserts are utilized within the pockets of the tool body, it is possible to limit the circular runout of each pocket to 5 microns or less, thereby allowing lower tolerances to produce a higher quality part.

Although the invention has been described in detail for the purposes of illustration based on what is currently considered to be the most practical and preferred embodiments, it is to be understood that such detail is solely for that purpose and that the invention is not limited to the disclosed embodiments, but, on the contrary, it is intended to cover modifications and equivalent arrangements. Furthermore, it is to be understood that the present invention contemplates that, to the extent possible, one or more features of any embodiment can be combined with one or more features of any other embodiment.

The invention claimed is:

1. A method for manufacturing a rotatable tool body with pockets positioned circumferentially between flutes about a cylindrical body to accept removable cutting inserts, wherein the method is comprised of the steps of:

beginning with a cylindrical blank having a longitudinal axis, identifying a plurality of concentric circles along the cylindrical blank, wherein the concentric circles are spaced along the longitudinal axis and define rows and wherein a plurality of insert pocket locations are spaced circumferentially about the cylindrical blank in each row and each insert pocket location is defined by a radial line perpendicular to the longitudinal axis; and machining a plurality of pockets at the insert pocket locations of each row, wherein all of the pockets associated with one row are machined before proceeding to machine all of the pockets associated with another row and wherein the machining of each pocket comprises the steps of machining a radial side wall surface and a back wall surface upon which a cutting insert contacts when secured within the pocket, wherein the plurality of insert pocket locations includes primary pocket locations, secondary pocket locations, tertiary pocket locations, and remaining pocket locations and wherein the machining of the plurality of insert pocket locations is performed in the following sequence at each row:
  first machining the blank at one insert pocket location which is the primary pocket location to form a primary pocket;
  then machining the blank at a pair of other pocket locations which are the secondary pocket locations adjacent to the primary pocket location and away from the primary pocket location to form a pair of secondary pockets;
  then machining the blank at a pair of still other pocket locations which are tertiary pocket locations, wherein each tertiary pocket location is adjacent to one of the secondary pocket locations and away from the primary pocket location to form a pair of tertiary pockets; and
  then continuing to machine the blank at remaining pocket locations which are a pair of next pocket locations, wherein each next pocket location is adjacent to one of the tertiary pocket locations and away from the primary pocket location to form another pair of pockets; and continuing this progression on the remaining pairs of pocket locations.

2. The method according to claim 1, wherein there is one additional pocket location and the sequence of machining further includes machining the single pocket location after all of the pairs of pocket locations have been machined.

3. The method according to claim 1, wherein each pocket further includes an axial side wall surface and the step of machining the pocket locations include machining the axial side wall surface.

4. The method according to claim 1, wherein there is a sequence for machining pairs of adjacent pocket locations along a row comprising the steps of:
  machining a first pocket at a primary pocket location;
  then machining a secondary pocket at a secondary pocket location immediately adjacent to the primary pocket location in an intended angular direction of rotation of the tool body away from the primary pocket location;
  then machining another secondary pocket at a secondary pocket location immediately adjacent to the primary pocket location in an opposite angular direction from the primary pocket location; and
  continuing to machine adjacent pairs of pockets in an alternating fashion at locations in an angular direction away from the most recently machined pocket.

5. The method according to claim 4, wherein there is one additional pocket location and the sequence of machining further includes machining the single pocket location after all of the pairs of pocket locations have been machined.

6. The method according to claim 1, wherein the pocket locations associated with each row are arranged at equal angles about the longitudinal axis.

7. The method according to claim 1, wherein the machining is performed by one of using a ball nose end mill, grinding, or electro-discharge machining.

8. The method according to claim 1, wherein the flutes are parallel to the longitudinal axis.

9. The method according to claim 1, wherein the flutes are helical along the longitudinal axis.

10. The method according to claim 1, wherein a circular runout is 5 microns or less for each pocket.

11. The rotatable tool body manufactured by the method of claim 1, comprising:
  a cylindrical body with a longitudinal axis extending therethrough;
  pockets arranged between flutes in rows along concentric circles spaced apart along the longitudinal axis of the cylindrical body, wherein each pocket has a radial side wall surface and a back wall surface upon which a cutting insert contacts when secured within the pocket;
  wherein the pockets are spaced circumferentially in rows defined by each concentric circle;
  wherein the radial side wall of a primary pocket has a value X for circular runout; and
  wherein the radial side wall circular runout for each pocket is progressively greater than the value of X as pockets extend circumferentially away from the primary pocket.

12. The rotatable tool body according to claim 11, wherein in an alternating pattern extending circumferentially away from the primary pocket, the circular runout increases from a value of X at the primary pocket.

13. The rotatable tool body according to claim 12, wherein when viewed toward a distal end of the tool body, the pocket closest to the primary pocket in the counterclockwise direction has a circular runout Y greater than X but with the smallest deviation from the circular runout value of X of the primary pocket relative to the remaining pockets.

14. The rotatable tool body according to claim 12, wherein when viewed toward a distal end of the tool body, the pocket closest to the primary pocket in the clockwise direction has a circular runout Y greater than X but with the smallest deviation from the circular runout value of X of the primary pocket relative to the remaining pockets.

15. The rotatable tool body according to claim 13, wherein when viewed toward a distal end of the tool body, the pocket closest to the primary pocket in the clockwise direction has a circular runout Z greater than Y but with the next smallest deviation from the circular runout value of X of the primary pocket.

16. The rotatable tool body according to claim 14, wherein when viewed toward a distal end of the tool body, the pocket closest to the primary pocket in the counterclockwise direction has a circular runout Z greater than Y but with the next smallest deviation from the circular runout value of X of the primary pocket.

17. The rotatable tool body according to claim 11, wherein the circular runout of the radial side walls is measured from the tool body longitudinal axis and an envelope defined by the circular runout values generally defines a lobe shape about the longitudinal axis with the smallest circular runout at the primary pocket.

18. The rotatable tool body according to claim 17, wherein the lobe shape is an eccentric circle about the longitudinal axis.

19. The rotatable tool body according to claim 11, wherein the circular runout for each pocket is 5 microns or less.

* * * * *